(12) United States Patent
Ashley

(10) Patent No.: US 8,510,405 B2
(45) Date of Patent: Aug. 13, 2013

(54) HANDLING BROADCAST DATA TOKENS

(75) Inventor: Alexis S. Ashley, Redhill (GB)

(73) Assignee: Koninklijke Philips N.V., Eindhoven (NL)

( * ) Notice: Subject to any disclaimer, the term of this patent is extended or adjusted under 35 U.S.C. 154(b) by 2662 days.

(21) Appl. No.: 09/950,484

(22) Filed: Sep. 10, 2001

(65) Prior Publication Data

US 2002/0038352 A1 Mar. 28, 2002

(30) Foreign Application Priority Data

Sep. 23, 2000 (GB) .................................. 0023408.8

(51) Int. Cl.
*G06F 15/16* (2006.01)

(52) U.S. Cl.
USPC .............................. 709/217; 709/230; 725/51

(58) Field of Classification Search
None
See application file for complete search history.

(56) References Cited

U.S. PATENT DOCUMENTS

| | | | | |
|---|---|---|---|---|
| 5,293,357 A | * | 3/1994 | Hallenbeck | 725/39 |
| 5,818,438 A | * | 10/1998 | Howe et al. | 715/718 |
| 6,012,086 A | * | 1/2000 | Lowell | 709/218 |
| 6,018,768 A | | 1/2000 | Ullman et al. | 709/218 |
| 6,025,837 A | | 2/2000 | Matthews, III et al. | |
| 6,529,526 B1 | * | 3/2003 | Schneidewend | 370/486 |
| 6,760,918 B2 | * | 7/2004 | Rodriguez et al. | 725/134 |
| 6,813,776 B2 | * | 11/2004 | Chernock et al. | 725/58 |
| 7,673,315 B1 | * | 3/2010 | Wong et al. | 725/51 |
| 2003/0031465 A1 | * | 2/2003 | Blake | 386/83 |

FOREIGN PATENT DOCUMENTS

| | | |
|---|---|---|
| EP | 682452 A2 | 11/1995 |
| EP | 0848553 A2 | 12/1997 |
| EP | 0892554 A2 | 6/1998 |
| EP | 19740079 | 3/1999 |
| WO | WO9613934 | 5/1996 |
| WO | 9938321 A1 | 7/1999 |
| WO | WO0137549 | 5/2001 |

OTHER PUBLICATIONS

Davic: "5. TV Anytime and TV Anywhere"; Specification; vol. 53, No. 12, pp. 1666-1673, 1999.

* cited by examiner

*Primary Examiner* — Kevin Bates

(57) ABSTRACT

In connection with the supply of data tokens identifying the forthcoming delivery of audio/video content, a method for obtaining content access data relating to forthcoming content is provided, together with a method for supplying such data and apparatus supporting the methods. Where a remote resolution utility (12) is available to supply access data, in the form of time and channel for broadcast, for example, in response to supply of an appropriate content identifier, the method comprises capturing, other that directly via the mechanism by which content is to be delivered, of a content identifier (16) for an item of content; determining from said content identifier said resolution utility; transmitting the captured content identifier to said resolution authority; and receiving the access data returned by said resolution utility.

26 Claims, 2 Drawing Sheets

Figure 1:
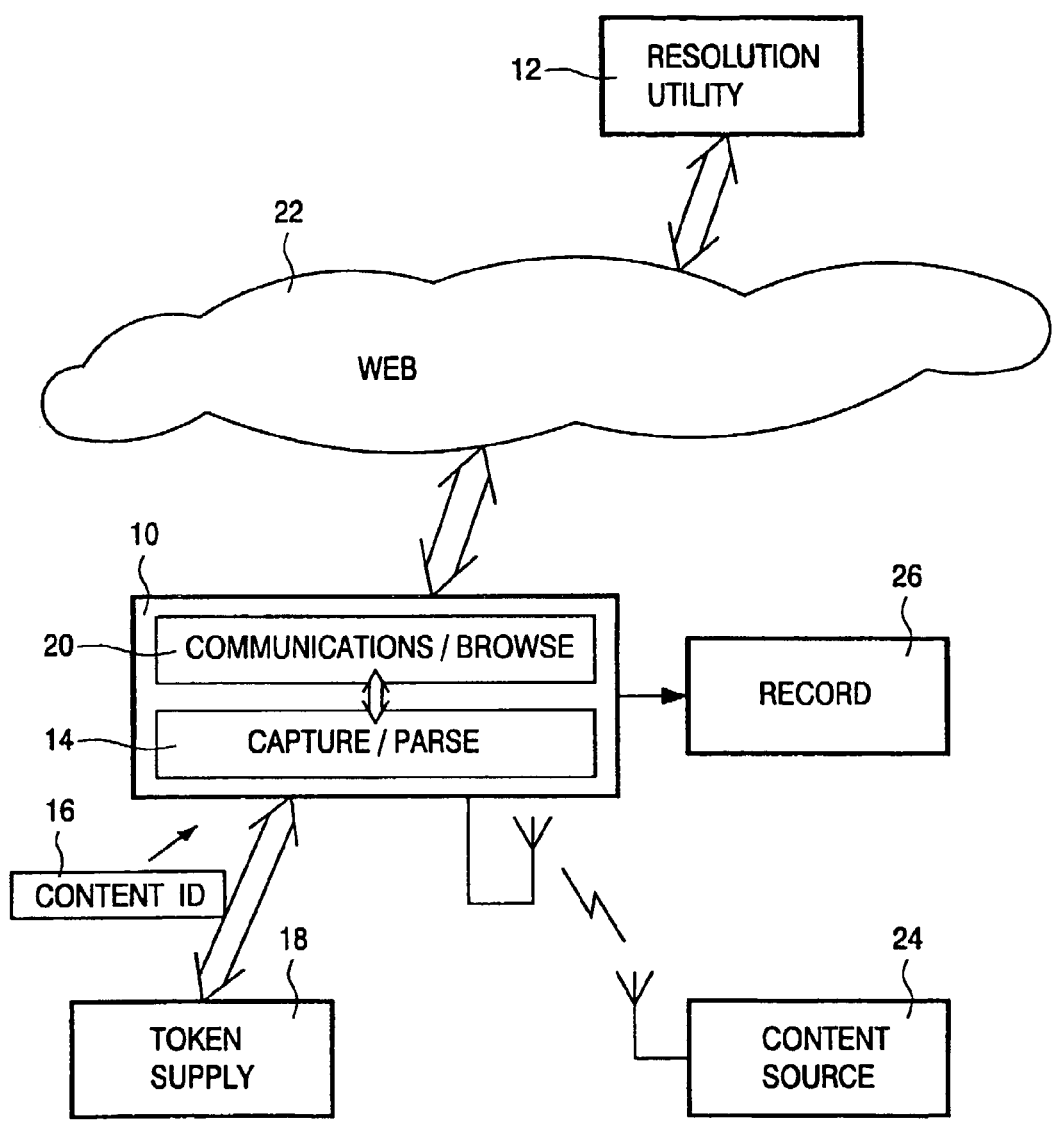

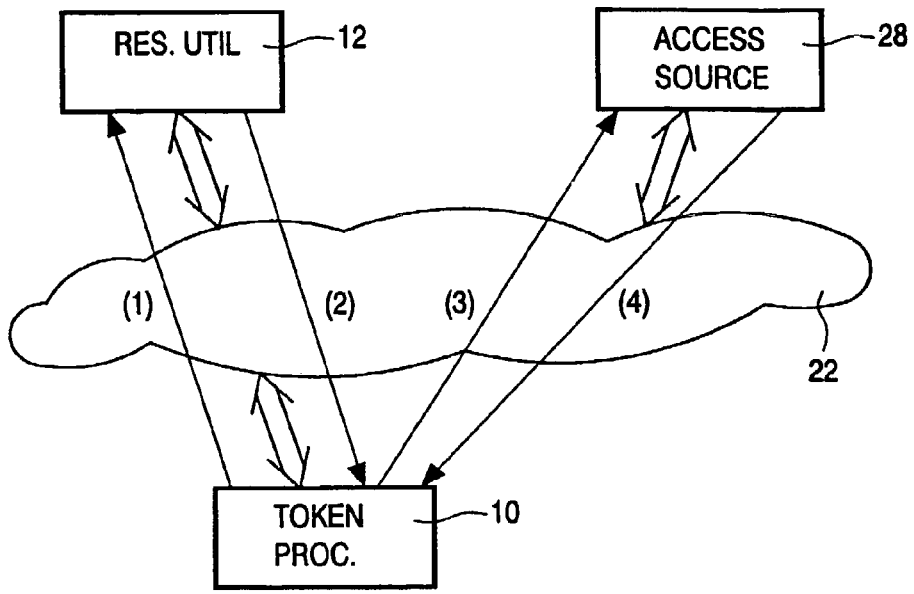
Fig.2
| Authority name | broadcaster.com |
| --- | --- |
| URL | http://www.broadcaster.com/tvanytime/resolution |
| Class | Primary |
| First valid date | 2000/02/01 |
| Last valid date | 2000/10/31 |
| Weighting | 2 |
| Descriptive text | The Broadcasters TV anytime service on the internet |
Fig.3
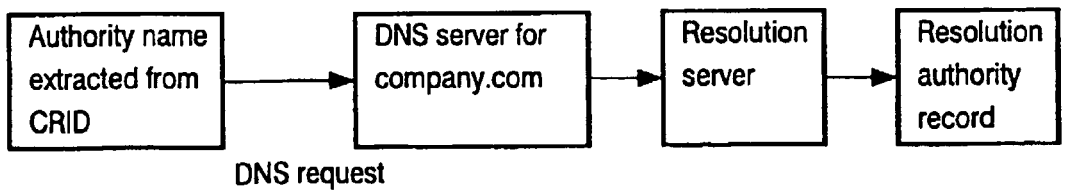
Fig.4

HANDLING BROADCAST DATA TOKENS

The present invention relates to a method and apparatus for the handling of data keys or tokens, which tokens enable the obtaining of further data. In particular, although not exclusively, the invention relates to the handling of tokens identifying selected items of audio and/or video material (hereinafter generically referred to as "content") which a user may wish to capture or have access to.

One example of a data capture system, in the form of a system for selectively recording data by a VCR, is described in International Patent application WO 96/13934. Broadcast news items of interest are items for selective recording, with the selection being made automatically on the basis of data keys or tokens in the form of previously entered selected key word criteria. An advance data stream representing the text to each forthcoming broadcast news item is provided in advance of the broadcast of the item, such that scanning for the key words enables the items of interest to be recognised and captured.

The TV Anytime forum is a non-profit organisation that aims to specify a set of standards for personal digital recorders (a PDR is a video recording device which uses a hard disk for video storage) to allow a user to find the content they want regardless of the time and location where the content can be found.

One feature of the TV Anytime specifications is content referencing. This specification provides the ability to go from a time and location independent identifier for a piece of content such as a TV programme (the identifier is called a CRID) to a time and location where the content can be acquired.

In the terminology of TV Anytime, an organisation that creates CRID's is called an authority. There can be any number of authorities producing CRID's, but each one is uniquely identified by a name. The TV Anytime standard uses the DNS name registration system to ensure that these names are unique. Each CRID has the name of the authority that issued it embedded in the CRID, and there is accordingly a requirement for a means to take an authority name from a CRID, and find the server on the Internet where the CRID can be converted to a location.

At a more general level, it is an object of the present invention to provide a means (method and apparatus) whereby data tokens or identifiers relating to forthcoming content may be placed by a supplier and extracted by a user without requiring the supplier of the delivery data for the content to have access to the means for content delivery itself.

In accordance with a first aspect of the present invention, there is provided a data processing apparatus operable to obtain from a remote resolution utility content access data relating to the forthcoming delivery of content, the apparatus including:

a data capture stage arranged, on receipt of a content identifier other than via the mechanism used to deliver said content, to determine from said data the address of said resolution utility; and a communications stage coupled with said data capture stage and configured, on receipt of a resolution utility address from said capture stage, to establish a communications link with said resolution utility, supply the captured content identifier thereto, and await the return of the content access data.

With the content identifier being received other than via the mechanism used to deliver the content, suppliers who do not have access to (or control over) the content delivery infrastructure can still set themselves up as resolution utilities, converting content identifiers (which might, for example, comprise a URL accompanying advance publicity for a broadcast) to content access data, such as a PDC (programme delivery control) or time/date settings identifying when the particular content may be captured.

The data capture stage may comprise means arranged to parse a received content identifier to identify therefrom the address of said resolution utility. The communications stage may comprise an Internet browser configured on receipt of a URL relating to a resolution utility, and to establish a network connection therewith, including transmitting said captured content identifier thereto and awaiting a reply including said content address data.

The invention further provides a broadcast video recorder comprising an apparatus as recited above, with the content address data comprising at least a date and time for broadcast of the content, and the recorder including a recording stage programmable with the said date and time. In such an arrangement, the content address data may include specification of one from a plurality of channels on which said content is to be delivered, and said recorder may be further configured to detect such a specification and to switch to recording from such channel at said date and time specified.

In accordance with a further aspect of the present invention there is provided a method for obtaining content access data relating to forthcoming content, wherein a remote resolution utility is available to supply said access data in response to supply of an appropriate content identifier, the method comprising the steps of: capturing, other that directly via the mechanism by which content is to be delivered, a content identifier for an item of content; determining from said content identifier said resolution utility; transmitting the captured content identifier to said resolution authority; and receiving the access data returned by said resolution utility.

In conjunction with the foregoing, the invention further provides a method for capturing broadcast content comprising the steps of obtaining content access data as recited above, together with the programming of automated data capture means with the received access data.

Yet further in accordance with the present invention there is provided a method for supplying to a user content access data relating to forthcoming content, where a resolution utility is arranged, in response to receipt of a particular content identifier, to supply to a user respective content access data, the method comprising:

supplying to a user a content identifier other than directly via the mechanism by which the content will be delivered, where the user has means for determining therefrom the address of the resolution utility, together with means for sending the content identifier to the resolution utility and receiving content access data from the same.

In the foregoing methods, the content may suitably be broadcast data, with the content access data including at least a date and/or time on which the content is to be broadcast, and/or a specification of the delivery medium by which the content is to be delivered. In this latter instance, the specification of the delivery medium may include identification of a wireless broadcast frequency, or may include identification of a broadcast data channel having a predetermined frequency.

A resolution utility may suitably be identified by an Internet URL. A resolution utility is identified by an Internet Domain Naming System name which identifies a first server from which data may be obtained, said data enabling a user to obtain access data.

Further features and advantages of the present invention are defined in the attached claims, the disclosure of which is incorporated herein by reference.

Further features and advantages of the present invention will become apparent from reading of the following description of preferred embodiments of the present invention, given by way of example only, and with reference to the accompanying drawings, in which:

FIG. 1 is a block schematic diagram of a data capture apparatus embodying the present invention;

FIG. 2 schematically represents a variation to the capture apparatus of FIG. 1;

FIG. 3 is an example of a resolving authority record for use by the apparatus of FIG. 1; and FIG. 4 represents resolving using a Domain Name Server.

In the introduction to this application, mention has been made of the TV Anytime forum and specifications, and the following exemplary embodiment is consistent with those specifications. It will be apparent to the skilled reader, however, that the present invention is more broadly applicable and that conformance with any particular specification is not a mandatory feature.

FIG. 1 is a schematic representation of apparatus embodying the invention, comprising a token processing stage 10 operable to obtain from a remote resolution utility 12 content access data relating to the forthcoming delivery of content. The token processor 10 comprises a data capture and parsing stage 14 arranged to receive tokens 16 in the form of a content identifier from a source thereof 18. On receipt of a content identifier 16, the data capture and parsing stage 14 determines from the token the address of the resolution utility 12.

The token processing stage 10 further comprises a communications stage 20 coupled with the data capture stage 14 and configured, on receipt of a resolution utility address from the capture stage, to establish a communications link with the resolution utility 12 via the Internet 22 (to which the communications stage provides an interface). The communications stage 20 supplies the captured content identifier 16 thereto and, as will be described in greater detail hereinafter, the resolution utility determines and returns the sought after content access data, or a further indicator as to how the processing stage might obtain the data—for example it might give the address of a further server from which the data might be obtained.

As mentioned previously, with the content identifier being received other than via the mechanism used to deliver the content, suppliers who do not have access to (or control over) the content delivery infrastructure (represented at 24) can still set themselves up as resolution utilities, converting content identifiers (which might, for example, comprise a URL accompanying advance publicity for a broadcast) to content access data, such as a PDC (programme delivery control) or time/date settings identifying when the particular content may be captured and recorded, as indicated by record replay stage 26 coupled to receive the obtained content access data from the token processing stage 10.

As mentioned, the resolution utility 12 might not deliver content access data directly. This is illustrated in FIG. 2, which represents a sequence of four communications, the first (1) of which is transmission of the content identifier from the token processing stage 10 to the resolving utility 12. The second (2) is the return carrying a URL for a further site 28 from which the access data may be obtained. The third (3) is the request for the access data transmitted from the token processing stage 10 to the further site 28, and the fourth (4) is the return of the content access data to the processing stage 10.

Each resolution utility (also referred to as a resolving authority) will require one or more resolving authority records to exist in the PDR for location resolution to take place. As shown by the example of FIG. 3, each record consists of an Authority Name (the Internet Domain Naming System DNS name used in a CRID, URL, Class indicator, First and Last Valid Date indicators (for when the authority can be used), a Weighting factor, and optionally also a piece of Descriptive Text describing the resolving authority.

The URL could point to a broadcast stream, or to a server on the internet. In the case of multiple records for the same authority, the PDR can choose to just use one of them, or try them all in turn. The weighting field can be used to give a hint to the PDR as to the order to try multiple records by providing the lowest weighting number to the resolution provider that should be tried first.

The class field defines whether this authority record defines a resolution authority which can resolve all CRID's for this authority name (class=primary) or only resolves some CRID's for this authority name (class=secondary).

The reason for providing start and end dates for resolution is so that resolution providers can move their resolution URL's and be sure all PDR's have switched to the new URL once the last valid date of the old resolution record has passed.

When a PDR receives a token for broadcaster.com, it will try:

http:/www.broadcaster.com/tvanytime/resolution

Considering now Internet protocol-based resolution, a party that wants to provide location resolution, but does not have access to the broadcast chain requires a method to allow the PDR to get their resolution records A DNS server consists of a program running on a computer that will translate internet names into internet addresses. This can be extended so that not only can it translate the internet name, it can also provide a translation for a specific protocol connected with the internet name, as described in internet RFC 2052. For example, a conventional server might translate www.company.com into 123.4.56.1.

A DNS server compliant to RFC 2052 provides the ability to not only ask "which machine is www.company.com?" but also "which machine that can serve HTTP is www.company.com?". For example, the server might convert http.tcp.www.company.com into webserver1.company.com port 80, which can then be translated to 123.4.56.1 port 80.

RFC 2052 provides an expansion of the DNS system that is currently used to allow internet connected machines to find mail servers. Rather than just being able to search for mail exchange (MX) records, it is now possible to search for service (SRV) records. SRV records are supported by the UNIX DNS server bind v8.1.1 and above and by Windows DNS v5.0 and above. A suitable name for the TV Anytime service record might be, for example, resolution.tvanytime.tcp.

If an organisation without access to the broadcast chain wishes to provide location resolution, the DNS name they use for their authority name must point to a DNS server that can return an SRV record that points to a server that will provide location resolution information, for example:

upi:company.com:thegreatescape the process for which is illustrated in FIG. 4.

The PDR does not have a resolution authority record for company.com, but it does have an IP link. The PDR issues a request to the DNS server for "company.com" for an SRV record of "resolution.tvanytime.tcp.company.com". The machine address returned by the SRV request can then be contacted for a resolution authority record.

The DNS lookup of the authority name only gives the PDR a hostname and a port number. In order to carry out location resolution, the PDR will need a resolution authority record.

To get a resolution authority record, the PDR connects to the hostname and port combination given by the DNS lookup.

Once the PDR has made the TCPIP connection to the remote host, the remote host sends the resolution authority record and closes the connection.

In some PDR implementations, it might be desirable to use an existing protocol such as HTTP to perform the retrieval of the resolution authority record. For this reason, it is permissible for the PDR to send a HTTP v1.0 get request for any of the following files:

http://index.rar
http://tva.rar
http://rar

The file names are fixed so that it is possible to implement the server returning the resolution authority record by using a HTTP server.

To enable the server and client to work with both retrieval methods, the server must consume any data that the client has sent before closing the connection. In order to remove the possibility of a denial of service attack, the server may close the connection after 400 bytes (which equates to 5 lines of text—more than enough for a HTTP v1.0 request). The server can just ignore the characters that it receives as it is always going to return the resolution authority record.

From reading the present disclosure, other modifications will be apparent to persons skilled in the art. Such modifications, whilst remaining within the scope of the following claims, may involve other features which are already known in the design, manufacture and use of data processing transmission and presentation systems, televisions and display apparatuses and component parts thereof and which may be used instead of or in addition to features already described herein. Although claims have been formulated in this application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same the technical problems as does the present invention. The applicants hereby give notice that new claims may be formulated to such features and/or combinations of features during the prosecution of the present application or of any further application derived therefrom.

The invention claimed is:

1. A data processing apparatus operable in a network including at least one content source for providing a plurality of content, a resolution utility for providing content access data relating to the forthcoming delivery of each of the plurality of content from the at least one content source, and at least one token supply source for providing content identifiers for each of the plurality of content, the apparatus comprising:
   a receiver arranged to receive a content identifier from the at least one token supply source other than said at least one content source, the content identifier including an address of said resolution utility; and
   a processor coupled with said receiver and configured
      to use the address of the resolution utility from said received content identifier to establish a communications link with said resolution utility,
      to supply the received content identifier thereto, and
      in return, to receive the content access data,
   wherein the receiver includes a plurality of channels for accepting delivery of the plurality of content from the at least one content source using content access data of each of the plurality of content.

2. The apparatus as claimed in claim 1, wherein said received content identifier is parsed to identify therefrom the address of said resolution utility.

3. The apparatus as claimed in claim 1, further comprising a processor for executing an Internet browser configured for determining a URL of the resolution utility required for establishing the communications link.

4. The apparatus as claimed in claim 1, wherein the apparatus is a broadcast video recorder and said content access data comprises at least a date and time of a broadcast of each of said plurality of content, the broadcast video recorder is programmable to start recording on said date and at said time indicated by the content access data.

5. The apparatus as claimed in claim 4, wherein said content access data includes a specification of one of the plurality of channels on which said plurality of content is to be delivered, and said broadcast video recorder is configured to detect the specification and to record from said channel at said programmed date and time indicated by the content access data.

6. A method for using a data processing apparatus in a network including at least one content source for providing a plurality of content, a resolution utility for providing content access data relating to forthcoming delivery of each of the plurality of content from the at least one content source, and at least one token source for providing content identifiers for each of the plurality of content, the method comprising the acts of:
   capturing from the at least one token source other than the at least one content source, a content identifier including an address for said resolution utility;
   transmitting the captured content identifier to said resolution utility corresponding to the address from said captured content identifier;
   receiving the content access data returned by said resolution utility, the content access data including timing relating to the forthcoming delivery of the plurality of content; and
   accepting delivery of the plurality of content from the at least one content source as specified by the content access data.

7. The method of obtaining content access data according to claim 6, further comprising an act of programming a video recorder with the timing received in the content access data.

8. The method as claimed in claim 6, wherein the plurality of content is broadcast data, and the content access data includes at least a date on which the plurality of content is to be broadcast.

9. The method as claimed in claim 6, wherein the plurality of content is broadcast data, and the content access data includes at least a time at which the plurality of content is to be broadcast.

10. The method as claimed in claim 6, wherein the plurality of content is broadcast data, and the content access data includes a specification of the delivery medium by which the content is to be delivered.

11. The method as claimed in claim 10, wherein the delivery medium is wireless and the specification of the delivery medium also includes identification of a wireless broadcast frequency.

12. The method as claimed in claim 10, wherein the specification of the delivery medium includes identification of a broadcast data channel having a predetermined frequency.

13. The method as claimed in claim 6, wherein the resolution utility is identified by an Internet URL.

14. The method as claimed in claim 6, wherein the resolution utility is identified by an Internet Domain Naming System name which identifies a first server from which data may be obtained, said data enabling a user to obtain content access data.

15. The method as claimed in claim 14, wherein the data from the first server is the address of a further server supplying said content access data.

16. The method as claimed in claim 6, wherein the data returned by said resolution utility includes an access source address for the content access data.

17. The method as claimed in claim 16, further comprising acts of:
transmitting a request for the content access data to the access source address; and
receiving from the access address the requested content access data.

18. A method for supplying to a user on a data processing apparatus in a network including at least one content source for providing a plurality of content, a resolution utility for providing content access data relating to forthcoming delivery of each of the plurality of content from the at least one content source, and at least one token source for providing content identifiers for each of the plurality of content, the method comprising acts of:
supplying to a user a content identifier from at least one token supply other than the content source, the content identifier includes an address of the resolution utility;
sending the content identifier to the resolution utility corresponding to the address;
receiving the content access data returned from the resolution utility, the content access data including timing relating to the forthcoming delivery of content; and
accepting delivery of the plurality of content from the at least one content source when specified by the content access data.

19. The method as claimed in claim 18, wherein the plurality of content is broadcast data, and the content access data includes at least a date on which the plurality of content is to be broadcast.

20. The method as claimed in claim 18, wherein the plurality of content is broadcast data and the content access data includes at least a time at which the content is to be broadcast.

21. The method as claimed in claim 18, wherein the plurality of content is broadcast data and the content access data includes a specification of a delivery medium by which the content is to be delivered.

22. The method as claimed in claim 21, wherein the delivery medium is a wireless broadcast and the specification of the delivery medium includes identification of a wireless broadcast frequency.

23. The method as claimed in claim 21, wherein the specification of the delivery medium includes identification of a broadcast data channel having a predetermined frequency.

24. The method as claimed in claim 18, wherein the resolution utility is identified by an Internet URL.

25. The method as claimed in claim 18, wherein the resolution utility is identified by an Internet Domain Naming System name which identifies a first server from which data may be obtained, said data enabling a user to obtain access data.

26. The method as claimed in claim 25, wherein the data from the first server is the address of a further server supplying said access data.

* * * * *